Sept. 25, 1962 H. I. HAZZARD 3,055,238
FILE GUIDE FOR SHARPENING SAWS
Filed June 24, 1960
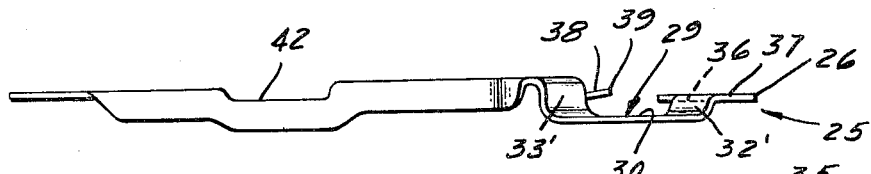
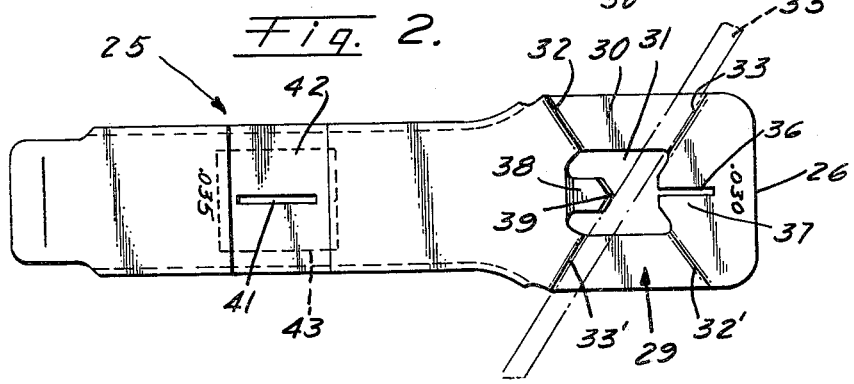
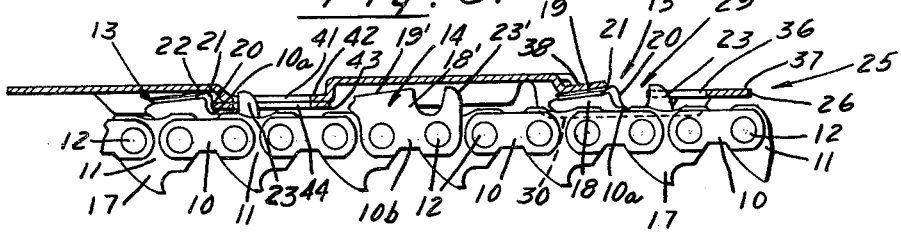
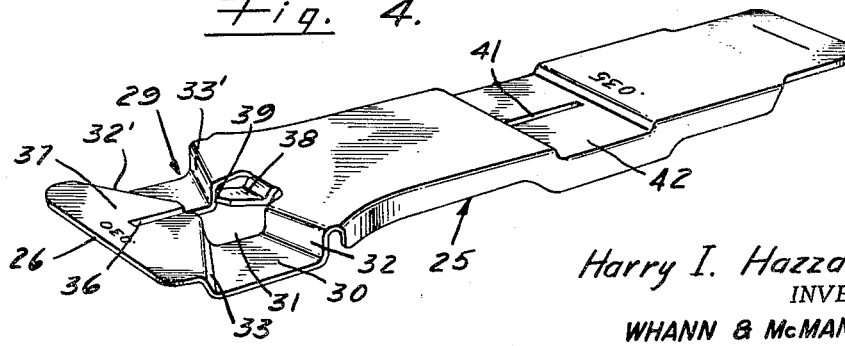
Harry I. Hazzard,
INVENTOR.
WHANN & McMANIGAL
Attorneys for Applicant United States Patent Office 3,055,238
Patented Sept. 25, 1962

3,055,238
FILE GUIDE FOR SHARPENING SAWS
Harry I. Hazzard, Los Angeles, Calif., assignor to McCulloch Corporation, Los Angeles, Calif., a corporation of Wisconsin
Filed June 24, 1960, Ser. No. 38,629
13 Claims. (Cl. 76—36)

The present invention relates generally to gauge devices and relates more particularly to a depth gauge and file guide device for use in sharpening the teeth of chain saws.

It is an object of the present invention to provide a gauge and guide device of this character for use in checking saw teeth and guiding the file while filing the teeth.

It is another object of the invention to provide a device of this character wherein wear on the file is at a minimum so that file life is prolonged.

Still another object of the invention is to provide a device of this character with which all of the teeth of the saw chain can be filed from one side of the chain. In other words, the work of filing the various teeth of the chain saw may be performed from one side, thereby saving substantial time in the sharpening of said teeth as the operator therefore does not have to move from one side of the saw to the other during the sharpening operation.

It is an object of the invention to provide a combination file guide and depth gauge indicator for use in sharpening the teeth of chain saws and which can be used to indicate the proper depth of a depth gauge immediately ahead of a tooth that has been sharpened without removing the device from the chain.

It is a further object of the invention to provide a device of this character that is compact.

It is a still further object of the invention to provide a device of this character that may be readily carried in the operator's pocket when not in use.

Another object of the invention is to provide a device of this character that is relatively inexpensive to manufacture.

Still another object of the invention is to provide a device of this character that is durable.

A further object of the invention is to provide a device of this character that is simple in construction.

A still further object of the invention is to provide a device of this character that is accurate and easy to use.

The characteristics and advantages of the invention are further sufficiently referred to in connection with the following detailed description of the accompanying drawings, which represent one embodiment. After considering this example, skilled persons will understand that many variations may be made without departing from the principles disclosed, and I contemplate the employment of any structure, arrangements, or modes of operation that are properly within the scope of the appended claims.

Referring to the drawings, which are for illustrative purposes only:

FIG. 1 is a side view of a gauge and device embodying the present invention;

FIG. 2 is a top plan view of the same;

FIG. 3 is a side view of a saw chain with the present device shown in longitudinal section and disposed on said saw chain; and FIG. 4 is a perspective view of the device.

Referring again to the drawings, there is illustrated in FIG. 3 is a saw chain including side links 10 and center links 11 connected consecutively by pintles 12. On selected side links 10a and 10b are left and right-hand allochiral side cutters 13 and 14 respectively on opposite sides of the chain. The two cutters form a cutter group in the chain and each group is preceded by a similar group and likewise followed by such a group. Extending downwardly from each of the center links 11 are sprocket engaging projections 17 by which the chain is driven by a sprocket.

The cutters 13 and 14 are comprised of a web or shank 18, 18' extending vertically outwardly from the selected side links. Extending inwardly from the outer portions of the respective shanks are transverse toe portions 19, 19'. The shanks have curved portions from which the toes extend and have beveled surfaces which form a continuous bevel cutting edge which provide a side wall cutting portion 20, a curved intermediate cutting portions 21 and bottom cutting portion 22.

Spaced forwardly of each cutter are depth gauges 23 and 23' extending outwardly from the selected side links a shorter distance than the corresponding toe cutting edge. The difference between the distances of the depth gauges and the toe cutting edges from the horizontal plane of the chain, extending through the pintles is predetermined according to the depth of the cut desired for each cutter, the individual cut being determined by the amount of the aforesaid difference.

As chain saws are used, the cutting edges become dull and they are sharpened with a file. As can be observed in FIG. 3, the top toe surfaces slope downwardly toward the rear and as the toe cutting edges are sharpened, they are lowered in relation to the horizontal plane of the chain and to the depth gauges. Thus, in order to maintain the same desired relationship between the length of the depth gauges and the length of the toe cutting edges from the horizontal plane of the chain when the cutting edge of a toe is filed, thereby lowering it, the corresponding depth gauge must be filed to have the same relative amount of material removed from its outer surface so that the depth gauge will be the predetermined distance shorter than the toe cutting edge according to their design to maintain the proper thickness of cut.

According to the present invention, the proper relationship between the depth gauges and the cutters which follow them can be maintained with the file guide and depth gauge or indicator, generally designated in the drawings as 25. The guide is comprised of an elongated, substantially flat main frame having depending sides on its central portion added to impart rigidity and ease of handling. Longitudinally inwardly of its forward end is a recessed portion generally designated as 29, formed having two transversely spaced base surfaces 30. The space between the base surfaces 30 is formed by a generally rectangular cut-away portion 31 provided to permit the placing of the file guide over a cutter to be sharpened as indicated in FIG. 3. Extending upwardly from the base surfaces 30 are transversely directed walls 32, 32' and 33, 33', each two of which, according to the corresponding numbers, are in a transverse vertical plane which intersects the transverse vertical plane of the other centrally within the cut-away portion 31. These walls such as 33, 33', along with the base surfaces 30 form the guides according to which a file 35, as indicated in phantom lines in FIG. 2, may be moved to and fro to sharpen the cutting edge on one of the cutters. The angle made by the transverse intersecting planes of the upwardly directed guide walls is determined by the bevel angle desired to be maintained on the teeth.

Forwardly of the cut-away portion 31 and in longitudinal alignment with its center, is a depth gauge receiving slot 36 extending vertically through the forward surface 37 of the main frame member. Slot 36 is adapted to be placed in position on the saw chain around the depth gauge such as 23, immediately ahead of the tooth being sharpened.

The upper surface 37 surrounding the slot 36 indicates a proper height of the depth gauge when the guide 25 is properly placed upon the chain. From the rearward upper edge of the cut-away portion 31, extends a forwardly directed positioning member 38, slanted upwardly at the same angle as the upper toe surfaces of the cutters on which it is to be used. As shown in FIG. 3, the positioner 38 is placed on top of the toe surface 19 when the recessed portion is placed over and around the cutter and the slot 36 is placed over the depth gauge 23. As may be best seen in FIG. 2, the forward indicating point 39 on positioner 38 is in longitudinal alignment with slot 36.

Spaced rearwardly of the recessed portion 29, a longitudinal distance to be determined according to the saw chain design on which the guide 25 is to be used, is a second longitudinally directed and centrally located slot 41 in longitudinal alignment with point 39 and slot 36. Slot 41 is cut vertically through a recesssed portion of the main frame so as to be surrounded by upper surface 42. As may be best seen in FIG. 3, when the forward end of the guide 25 is placed upon a saw chain, as discussed above, the rearward slot 41 is in position to be fitted over a predetermined depth gauge on the chain. For the purpose of holding the guide in better alignment on the rear depth gauge, a slotted plate 43 is secured to the under side of the main frame so that the slot 44 in the plate 43 is in alignment with slot 41. In other words, the added wall surface forming the slot 44 makes it possible to hold the guide frame in more accurate alignment on the saw chain.

In order to use the guide 25 to sharpen the cutting edges on a saw chain, it is placed upon a chain, as shown in FIG. 3, with the positioner 38 in contact with the toe of the cutter to be sharpened, with the slot 36 over the depth gauge 23 immediately forward of the cutting edge to be sharpened and the rearward slot 41 is placed over a depth gauge, the slot 41 being positioned to be fittted over a specific depth gauge on the chain for which the guide is made. During the filing operation, the walls 33, 33', for example, and the point 39 on the positioner 38 are moved slightly rearwardly of the beveled surface forming the cutting edge so that the file does not abrade the walls. In other words, the walls are a sight guide for sharpening the cutting edge rather than a contact surface on which the file moves to and fro during the sharpening operation. As may be seen in FIG. 3, the unhardened metal surface 30 is positioned to support the file during the sharpening. This type of sharpening is highly successful in that the file is given proper guidance without any unnecessary wear on it as would occur if the file were used in contact with the walls or on a hardened base surface. When a proper shaped file is used, that is, according to the continuous surface of the cutting edge, both the toe and shank portions may be sharpened at the same time.

When the cutting edges have been sharpened, the guide is moved forwardly on the chain so that the point 39 is directly above a point on the toe cutting edge. When the guide is in the said position, the continuous beveled surface may be checked for proper alignment by sighting along the walls and the base of the recessed portion 29. Generally, an experienced operator will keep the beveled surface in the proper alignment with the guide as he files and the operation will be completed in one step on each cutter.

Adjacent the forward end 26 are the numbers ".030" which indicate that when the bite thickness is to be about 0.030 inch for a particular saw chain, or stated differently, when the depth gauge is to be 0.030 inch shorter than the cutting edge of the toe, the top of the depth gauge is to be filed down to be flush with the surface 37. Thus, when the sharpening of a cutter is completed and the point 39 is on the toe cutting edge, the part of the depth gauge 23 extending upwardly above the surface 37 on the guide is filed down to the surface to recreate the proper relationship between the toe cutting edge and the depth gauge so that the cutter will make the designed bite or cut In FIG. 3, the cutting edge on the forward cutter 13 has been sharpened and the top of the depth gauge 23 is extending upwardly through the slot 36. Then to complete the filing operation, the part of the depth gauge extending above the surface 37 is removed.

After the cutting edges and its corresponding depth gauge have been restored to their proper relationship, the guide 25 is moved to the next cutter, such as 14, in the approximate center of the chain in FIG. 3. To sharpen the continuous cutting edge on the cutter 14, it is only necessary to move the file 35 in directions parallel with the walls 32, 32' and the sharpening operation can be performed from the same side of the chain as the sharpening of cutter 13. This provides the obvious advantage of not having to sharpen from both sides of the chain and saves a considerable amount of time in the sharpening operation.

If it is desired that a deeper cut be made by each individual cutter, each depth gauge is shortened a greater amount; that is, the relationship between the toe and the depth gauge chain is changed. Provision is made for this type of operation in the present invention whereby, first, if necessary, all of the cutting edges are sharpened, as described above, and the distances from the outer surfaces of the toes to the horizontal plane of the chain are shortened. Then, for example, if the bite is to be increased from 0.030 inches to 0.035 inch in a particular saw chain, the positioner 38 is successively placed with its point 39 on the edges of each toe and the rear slot 41 is placed on a corresponding rear depth gauge 23. As indicated by the numbers ".035" on the particular guide when the top of the depth gauge in slot 41 is flush with surface 42, the bite distance is nominally 0.035 inch. In other words, when each depth gauge placed in slot 41 is filed down to be flush with surface 42, the bite for each individual cutter has been increased to 0.035 inch.

A file guide, according to the present invention, may be specifically designed for any particular design of chain according to its cutter size and depth of cut and may have a plurality of slots surrounded by surfaces of different heights to increase or decrease the bite of the individual cutters by filing the corresponding depth gauges to the respective surfaces. It is clear that the file guide and depth gauge indicator may be made in various other forms without departing from the inventive principles disclosed herein.

I claim:

1. The combination filing guide for use in the sharpening of saw chain teeth and for use in the filing of depth gauges to correspond to the teeth, said saw chain being of the type having right and left-hand longitudinally arranged cutters on selected links of the chain, each cutter having a toe edge extending transversely from a shank and having a cutting edge formed on each toe and shank, and a depth gauge spaced forwardly of the cutting edge on selected links, said guide comprising: an elongated member; means on said member for fitting on a cutter to expose its cutting edge and to provide a guide for a file to sharpen said last mentioned cutting edge; and means forwardly on said member to measure the depth of, and to guide for filing a depth gauge spaced forwardly of said last mentioned cutting edge.

2. The combination filing guide for use in the sharpening of saw chain teeth and for use in the filing of depth gauges to correspond to the teeth, said saw chain being of the type having right and left-hand longitudinally arranged cutters on selected links of the chain, each cutter having a toe edge extending transversely from a shank and having a continuous cutting edge formed on each toe and shank, and a depth gauge spaced forwardly of the cutting edge on each selected link, said guide comprising: an elongated member; means on said member for fitting on a cutter to expose its cutting edge and to provide a guide for a file to sharpen said last mentioned cutting edge from either transverse side thereof; and means forwardly on said member to measure the depth of, to expose and to guide for filing the depth gauge spaced forwardly of said last mentioned cutting edge.

3. The combination filing guide for use in the sharpening of saw chain teeth and for use in the filing of depth gauges to correspond to the teeth, said saw chain being of the type having right and left-hand longitudinally arranged cutters on selected links of the chain, each cutter having a toe edge extending transversely from a shank and having a continuous cutting edge formed on each toe and shank, and a depth gauge spaced forwardly of the continuous cutting edge on selected links, said guide comprising: an elongated substantially flat member; means on said member for slidably fitting on a cutter to expose its continuous cutting edge and to provide a guide to sharpen said last mentioned cutting edge from either transverse side thereof; a positioner pointer in said means on said member to be placed on the toe cutting edge of said last mentioned edge; slot means forwardly on said member to engage and to expose for filing a depth gauge spaced forwardly of said continuous cutting edge; means on said slot means for indicating the amount to be filed off the end of said depth gauge engageable in said slot means when said pointer is placed on said last mentioned toe cutting edge; and means on said member to engage another depth gauge on said chain for supporting said member.

4. The combination filing guide for use in the sharpening of saw chain teeth and for use in the filing of depth gauges to correspond to the teeth after they have been sharpened, said saw chain being of the type having right and left-hand longitudinally arranged cutters on selected links of the chain, each cutter having a toe edge extending transversely from a shank and having a continuous cutting edge formed on each toe and shank, and a depth gauge spaced forwardly of the continuous cutting edge on each selected link, said guide comprising: an elongated substantially flat member; means adjacent one end of said member for slidably fitting on a cutter to expose its continuous cutting edge and to provide a guide for a file to sharpen said last mentioned continuous cutting edge from either transverse side thereof; a positioner pointer in said means adjacent said one end to be placed on the cutting edge of said last mentioned cutting edge after it is sharpened; means forwardly on said member to engage and to expose for filing the depth gauge spaced forwardly of said last mentioned continuous cutting edge; slot means in said member to engage another depth gauge on said chain for supporting said member; and means on said slot means for indicating the amount to be filed off the end of said another depth gauge engageable in said slot means when said pointer is placed on said last mentioned toe cutting edge after it is sharpened and after the continuous edge on its selected link is sharpened.

5. The combination filing guide for use in the sharpening of saw chain teeth and for use in the filing of depth gauges to correspond to the teeth after they have been sharpened, said saw chain being of the type having right and left-hand longitudinally arranged cutters on selected links of the chain, each cutter having a toe edge extending transversely from a shank and having a continuous cutting edge formed on each toe and shank, and a depth gauge spaced forwardly of the continuous cutting edge on each selected link, said guide comprising: an elongated substantially flat member; means adjacent one end of said member for slidably fitting on a cutter to expose its continuous cutting edge and to provide a guide for a file to sharpen said last mentioned continuous cutting edge from either transverse side thereof; a positioning indicator in said means adjacent said one end to be placed on the toe cutting edge of said last mentioned continuous cutting edge after it is sharpened; first slot means forwardly on said member to engage and to expose for filing the depth gauge spaced forwardly of said last mentioned continuous cutting edge; means on said first slot means for indicating the amount to be filed off the end of said depth gauge engageable in said first slot means when said indicator is placed on said last mentioned toe cutting edge after it is sharpened; second slot means on said member to engage another depth gauge on said chain for supporting said member; and means on said second slot means for indicating the amount to be filed off the end of said another depth gauge engageable in said second slot means when said indicator is placed on said last mentioned toe cutting edge after it is sharpened and after the continuous cutting edge on the selected link of said another depth gauge is sharpened.

6. The combination filing guide for use in the sharpening of saw chain teeth and for use in the filing of depth gauges to correspond to the teeth after they have been sharpened, said saw chain being of the type having right and left-hand longitudinally arranged cutters on selected links of the chain, each cutter having a toe edge extending transversely from a shank and having a continuous cutting edge formed on each toe and shank, and a depth gauge spaced forwardly of the continuous cutting edge on selected links, said guide comprising: an elongated substantially flat member; a depressed portion on said member; downwardly directed walls forming guide surfaces on said depressed portions; an opening in said depressed portion for fitting on a cutter to expose its continuous cutting edge and for aligning sufficient of said guide surfaces with said last mentioned edge to provide a guide for filing it; a longitudinally directed slot through said member for slidable engagement with the depth gauge immediately forwardly of said last mentioned cutting edge; and a positioning indicator extending from said member over said opening toward said slot and adapted to extend on the toe of said cutter, said indicator being adapted to have its end over said opening to be placed on the toe cutting edge of said last mentioned continuous edge after it has been sharpened to thereby move said slot on said last mentioned depth gauge to indicate the amount to be filed from said last mentioned depth gauge.

7. The combination filing guide for use in the sharpening of saw chain teeth and for use in the filing of depth gauges to correspond to the teeth after they have been sharpened, said saw chain being of the type having right and left-hand longitudinally arranged cutters on selected links of the chain, each cutter having a toe edge extending transversely from a shank and having a continuous cutting edge formed on each toe and shank, and a depth gauge spaced forwardly of the continuous cutting edge on each selected link, said guide comprising: an elongated substantially flat member; a depressed portion adjacent one end of said member; downwardly directed walls forming guide surfaces on said depressed portions; an opening in said depressed portion for fitting on a cutter to expose its continuous cutting edge and for aligning sufficient of said guide surfaces with said last mentioned edge to provide a guide for filing it; a longitudinally directed slot through said member between said one end and said depressed portion for slidable engagement with the depth gauge immediately forwardly of said last mentioned cutting edge; a positioning indicator extending from said member over said opening toward said slot and adapted to extend on the toe of said cutter, said indicator being adapted to have its end over said opening to be placed on the toe cutting edge of said last mentioned continuous edge after it has been sharpened to thereby move said slot on said last mentioned depth gauge to indicate the amount to be filed from said last mentioned depth gauge; and a second longitudinally directed slot through said member spaced from said first mentioned slot, said slots and said indicator being in longitudinal alignment, said second slot being positioned to engage another depth gauge on said chain for aligning and supporting said member thereon.

8. The combination filing guide for use in the sharpening of saw chain teeth and for use in the filing of depth gauges to correspond to the teeth, said guide comprising: an elongated substantially flat member; a depressed portion adjacent one end of said member; downwardly directed walls forming two sets of side guide surfaces on said depressed portion, said walls being in intersecting transverse planes; a base surface of said depressed portion joining said walls and forming a bottom guide surface; an opening in said depressed portion for fitting over a cutter to expose its cutting edge and for aligning at least one set of said guide surfaces with said last mentioned edge to provide a guide for filing it; a longitudinally directed slot through said member between said one end and said depressed portion for slidable engagement with a depth gauge immediately forwardly of said last mentioned cutting edge; and a positioning indicator extending from said member over said opening toward said slot, said indicator being adapted to have its end over said opening to be placed on the cutting edge after it has been sharpened to thereby move said slot on said last mentioned depth gauge to indicate the amount to be filed from said last mentioned gauge.

9. The combination filing guide for use in the sharpening of saw chain teeth and for use in the filing of depth gauges to correspond to the teeth after they have been sharpened, said saw chain being of the type having right- and left-hand longitudinally arranged cutters on selected links of the chain, each cutter having a toe edge extending transversely from a shank and having a continuous cutting edge formed on each toe and shank, and a depth gauge spaced forwardly of the continuous cutting edge on each selected link, said guide comprising: an elongated substantially flat member; a depressed portion adjacent one end of said member; downwardly directed walls forming two sets of side guide surfaces on said depressed portion, said walls being in intersecting transverse planes; a base surface of said depressed portion joining said walls and forming a bottom guide surface; an opening in said depressed portion for fitting over a cutter to expose its continuous cutting edge and for aligning at least one set of said guide surfaces with said last mentioned edge to provide a guide for filing it; a longitudinally directed slot through said member between said one end and said depressed portion for slidable engagement with the depth gauge immediately forward of said last mentioned cutting edge; a positioning indicator extending from said member over said opening toward said slot and adapted to extend on the toe of said cutter, said indicator being adapted to have its end over said opening to be placed on the toe cutting edge of said last mentioned continuous edge after it has been sharpened to thereby move said slot on said last mentioned depth gauge to indicate the amount to be filed from said last mentioned gauge; and a second longitudinally directed slot through said member spaced from said first mentioned slot, said slots and said indicator being in longitudinal alignment, said second slot being positioned to engage another depth gauge on said chain for aligning and supporting said member thereon, the surface of said member surrounding said second slot being on a different level from the surface surrounding the first slot.

10. The combination filing guide for use in the sharpening of saw chain teeth and for use in the filing of depth gauges to correspond to the teeth, said chain being of the type having right and left-hand longitudinally arranged cutters on selected links of the chain, each cutter having a toe edge extending transversely from a shank and having a continuous cutting edge formed on each toe end shank, and a depth gauge spaced forwardly of the continuous cutting edge on said selected links, said guide comprising: an elongated member; means on said member for fitting on a cutter to expose its cutting edge and to provide a guide to sharpen said last mentioned cutting edge; and means on said member to measure the depth of and to guide for filing a depth gauge on said chain.

11. The combination filing guide for use in the sharpening of saw chain teeth and for use in the filing of depth gauges to correspond to the teeth, said chain being of the type having right and left-hand longitudinally arranged cutters on selected links of the chain, each cutter having a toe edge extending transversely from a shank and having a continuous cutting edge formed on each toe and shank, and a depth gauge spaced forwardly of the continuous cutting edge on said selected links, said guide comprising: an elongated member; means on said member for fitting on a cutter to expose its cutting edge and to provide a guide for a file to sharpen said last mentioned cutting edge; and means rearwardly on said member to measure the depth of and to guide for filing a depth gauge spaced rearwardly of said last mentioned cutting edge.

12. The combination filing guide for use in the sharpening of saw chain teeth and for use in the filing of depth gauges to correspond to the teeth, said chain being of the type having right and left-hand longitudinally arranged cutters on selected links of the chain, each cutter having a toe edge extending transversely from a shank and having a continuous cutting edge formed on each toe and shank, and a depth gauge spaced forwardly of the continuous cutting edge on said selected links, said guide comprising: an elongated member; means on said member for fitting on a cutter to expose its cutting edge and to provide a guide for a file to sharpen said last mentioned cutting edge; a positioner pointer in said means on said member to be placed on the toe of and adjacent the cutting edge of said last mentioned edge to indicate when the cutting edge is in a correct position for filing relative to said last means; and means on said member to expose a depth gauge on said chain for filing.

13. The combination filing guide for use in the sharpening of saw chain teeth and for use in the filing of depth gauges to correspond to the teeth, said chain being of the type having right and left-hand longitudinally arranged cutters on selected links of the chain, each cutter having a toe edge extending transversely from a shank and having a continuous cutting edge formed on each toe and shank, and a depth gauge spaced forwardly of the continuous cutting edge on said selected links, said guide comprising: an elongated member; means on said member for fitting on a cutter to expose its cutting edge and to provide a guide for a file to sharpen said last mentioned cutting edge; a positioner pointer in said means on said member to be placed on the toe of the cutting edge of said last mentioned edge to indicate when the cutting edge is in a correct position for filing relative to said last means; means forwardly on said member to expose for filing a depth gauge spaced forwardly of said continuous cutting edge; and means on said last means for indicating the amount to be filed off the end of said depth gauge when said pointer is placed on said last mentioned toe cutting edge.

References Cited in the file of this patent
UNITED STATES PATENTS

| | | |
|---|---|---|
| 2,727,830 | Siverson | Mar. 13, 1956 |
| 2,762,241 | Nielson | Sept. 11, 1956 |
| 2,822,707 | Gommel | Feb. 11, 1958 |
| 2,871,728 | Tremblay | Feb. 3, 1959 |
| 2,898,782 | Consoletti | Aug. 11, 1959 |

UNITED STATES PATENT OFFICE
CERTIFICATE OF CORRECTION

Patent No. 3,055,238                     September 25, 1962

Harry I. Hazzard

It is hereby certified that error appears in the above numbered patent requiring correction and that the said Letters Patent should read as corrected below.

Column 8, line 65, for "2,727,830" read -- 2,737,830 --; same column 8, list of references cited, add the following:

FOREIGN PATENTS 587,303    Canada---------------Nov. 17, 1959

Signed and sealed this 12th day of February 1963.

(SEAL)
Attest:

ERNEST W. SWIDER
Attesting Officer

DAVID L. LADD
Commissioner of Patents